(12) United States Patent
Olmsted-Thompson

(10) Patent No.: US 10,038,649 B2
(45) Date of Patent: Jul. 31, 2018

(54) PACKET GENERATION AND INJECTION

(71) Applicant: VMware, Inc., Palo Alto, CA (US)

(72) Inventor: Jeremy Olmsted-Thompson, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 75 days.

(21) Appl. No.: 15/356,249

(22) Filed: Nov. 18, 2016

(65) Prior Publication Data

US 2018/0145932 A1  May 24, 2018

(51) Int. Cl.
*H04L 12/935* (2013.01)
*H04L 12/46* (2006.01)
*H04L 12/24* (2006.01)
*H04L 12/26* (2006.01)

(52) U.S. Cl.
CPC .......... *H04L 49/30* (2013.01); *H04L 12/4641* (2013.01); *H04L 41/145* (2013.01); *H04L 43/50* (2013.01)

(58) Field of Classification Search
CPC ... H04L 49/30; H04L 12/4641; H04L 41/145; H04L 43/50
See application file for complete search history.

(56) References Cited

U.S. PATENT DOCUMENTS

| | | | |
|---|---|---|---|
| 5,606,668 A | 2/1997 | Shwed | |
| 5,835,726 A | 11/1998 | Shwed et al. | |
| 6,662,227 B2 | 12/2003 | Boyd et al. | |
| 8,386,409 B2 | 2/2013 | Sanders et al. | |
| 9,210,126 B2 | 12/2015 | Rash et al. | |
| 2004/0066759 A1 | 4/2004 | Molteni et al. | |
| 2006/0013142 A1* | 1/2006 | Hongal | H04L 12/462 370/248 |

OTHER PUBLICATIONS

IP Service Level Agreement from Cisco Systems, Inc., retrieved on Sep. 16, 2016, (19 pgs.).

* cited by examiner

*Primary Examiner* — Ronald B Abelson

(57) ABSTRACT

The present disclosure is related to packet generation and injection. An example testing system for packet generation and injection can include a packet generation and injection apparatus connected to a host. The packet generation and injection apparatus may be configured to cause a plurality of packets, each having a different source address, to be generated at the host, cause the plurality of packets to be injected through a network interface of the host. The example testing system may include a syslog server connected to the host. The syslog server may be configured to ingest and process the plurality of packets.

20 Claims, 3 Drawing Sheets

PACKET GENERATION AND INJECTION

BACKGROUND

Virtual computing instances (VCIs), such as virtual machines, virtual workloads, data compute nodes, clusters, and containers, among others, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. VCIs can be deployed on a hypervisor provisioned with a pool of computing resources (e.g., processing resources, memory resources, etc.). There are currently a number of different configuration profiles for hypervisors on which VCIs may be deployed.

DETAILED DESCRIPTION

Figure 1:
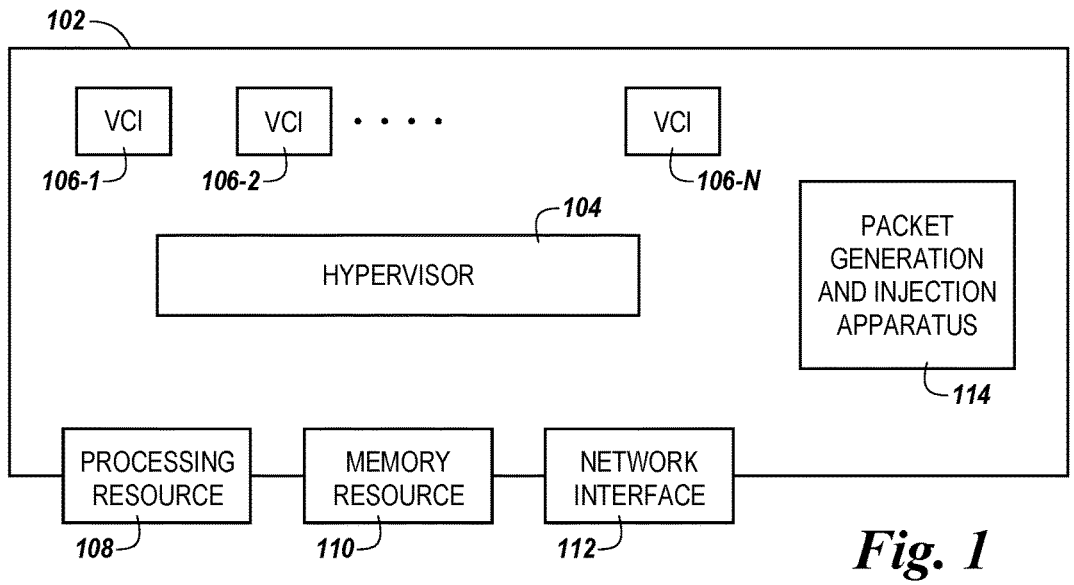
FIG. 1 is a diagram of a host for packet generation and injection according to the present disclosure.

The term "virtual computing instance" (VCI) covers a range of computing functionality. VCIs may include non-virtualized physical hosts, virtual machines (VMs), and/or containers. Containers can run on a host operating system without a hypervisor or separate operating system, such as a container that runs within Linux. A container can be provided by a virtual machine that includes a container virtualization layer (e.g., Docker). A VM refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more lightweight than VMs.

Multiple VCIs can be configured to be in communication with each other in a software defined data center. In such a system, information can be propagated from an end user to at least one of the VCIs in the system, between VCIs in the system, and/or between at least one of the VCIs in the system and a non-virtualized physical host.

Software defined data centers are dynamic in nature. For example, VCIs and/or various application services, may be created, used, moved, or destroyed within the software defined data center. When VCIs are created (e.g., when a container is initialized), various processes and/or services start running and consuming resources. As used herein, "resources" are physical or virtual components that have a finite availability within a computer or software defined data center. For example, resources include processing resources, memory resources, electrical power, and/or input/output resources, etc.

In a software defined data center, it may be beneficial to monitor and/or identify message traffic between multiple VCIs and/or non-virtualized physical hosts to monitor message traffic as packets move amongst the VCIs and/or non-virtualized physical hosts in the software defined data center. In some embodiments, monitoring message traffic can facilitate testing of a software defined data center. However, monitoring message traffic in a software defined data center may pose a number of challenges, and may suffer from a number of shortcomings. As used herein, "monitor" means to observe or track the behavior of something over time. For example, message traffic through the software defined data center (or a portion thereof) may be monitored (e.g., tracked, examined, etc.) over a period of time. As used herein, "identified" means to single out a particular something among a plurality of things. For example, a particular packet among a plurality of message packets may be identified (e.g., it may be singled out).

For example, in some approaches, traffic may be generated using multiple VCIs and/or non-virtualized physical hosts associated with the software defined data center, and the traffic may be monitored between the VCIs and/or non-virtualized physical hosts in the software defined data center. As another example, message traffic may be generated and injected through the software defined data center after the point of ingestion to simulate traffic between multiple VCIs and/or non-virtualized physical hosts associated with the software defined data center. This may allow for message traffic to be monitored after the point of ingestion, but may leave gaps in the testing prior to the point of ingestion. For example, it may be difficult to determine what may occur to packets that are injected prior to the point of ingestion. As used herein, a "point of ingestion" is a location (e.g., a VCI, non-virtualized physical host, router, or other network device) in a software defined data center that may obtain and/or import data for immediate use or storage, or a particular point in time at which data is obtained and/or imported for immediate use or storage. In some approaches, the former solution may require multiple VCIs to be carried out, while the gaps in testing exhibited by the latter solution may fail to adequately monitor message traffic in the software defined data center.

In addition, due to the size and desired scalability of software defined data center, monitoring all (or even a percentage of) message traffic can be problematic because large amounts of data may need to be collected and analyzed, sometimes constantly, to monitor message traffic, particularly as part of a test operation on the software defined data center.

In contrast, embodiments of the present disclosure may allow for message traffic to be generated at a single VCI or non-virtualized physical host. This message traffic may then be injected through a network interface (e.g., a local network interface) to simulate message traffic between multiple VCIs and/or non-virtualized physical hosts to monitor message traffic as packets move amongst the VCIs and/or non-virtualized physical hosts in the software defined data center in the absence of multiple VCIs and/or non-virtualized physical hosts. Advantageously, embodiments described herein can allow for generation and/or injection of packets by a single VCI or non-virtualized physical host, which may in turn allow for monitoring, identification, and/or analysis of message traffic in a software defined data center. In some embodiments, such monitoring, identification, and/or analysis of message traffic in a software defined data center may facilitate test operations on the software defined data center by, for example, allowing for simulation of multi-source message traffic using a single VCI or non-virtualized physical host.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 214 in FIG. 2. A group or plurality of similar elements or components may generally be referred to herein with a single element number. For example a plurality of reference elements 106-1, 106-2, . . . , 106-N may be referred to generally as 106. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Embodiments of the present disclosure are directed to packet generation and injection, for example, in the context of a software defined data center (e.g., a distributed computing environment) including one or more VCIs. In some embodiments, packets may be generated by a VCI or non-virtualized physical host in the distributed system and/or injected through an interface and/or syslog server and/or ingestion system associated with the distributed system. The VCI or non-virtualized physical host may include an operating system (e.g., Linux, Windows®, etc.). The generated packets may be monitored to test the distributed system, for example, to simulate the behavior of message traffic from multiple VCIs and/or remote message sources using a single VCI or non-virtualized physical host.

For example, a packet generation and injection apparatus may be deployed to a VCI or non-virtual physical host associated with a software defined data center. The packet generation and injection apparatus can generate packets (e.g., mock packets, spoofed packets, packets with spoofed and/or mocked Internet protocol (IP) addresses, etc.) and/or inject the packets through an interface associated with the software defined data center and/or injected to an ingestion system. In some embodiments, the ingestion system may comprise a syslog server.

In some embodiments, a testing system for packet generation and injection can include a packet generation and injection apparatus connected to a host. The packet generation and injection apparatus may be configured to cause a plurality of packets, each having a different source address, to be generated at the host, cause the plurality of packets to be injected through a network interface of the host. The example testing system may include a syslog server. The syslog server may be configured to ingest and process the plurality of packets. As used herein, a "syslog server" is a logging server that is configured to receive event messages generated by devices and/or components connected to a network. For example, a syslog server may receive and/or log event messages from a host, VCI(s), kernel, or other devices and/or components in a software defined data center. The event messages may include a facility code, which may indicate a software type that generated the message, and/or an assigned severity level for the message.

FIG. 1 is a diagram of a host 102 for packet generation and injection according to the present disclosure. The system can include a host 102 with processing resources 108 (e.g., a number of processors), memory resources 110 (e.g., main memory devices and/or storage memory devices), and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of VCIs 106-1, 106-2, . . . , 106-N (referred to generally herein as "VCIs 106"). The VCIs can be provisioned with processing resources 108 and/or memory resources 110 and can communicate via the network interface 112. The processing resources 108 and the memory resources 110 provisioned to the VCIs can be local and/or remote to the host 102. For example, in a software defined data center, the VCIs 106 can be provisioned with resources that are generally available to the software defined data center and are not tied to any particular hardware device. By way of example, the memory resources 110 can include volatile and/or non-volatile memory available to the VCIs 106. The VCIs 106 can be moved to different hosts (not specifically illustrated), such that a different hypervisor manages the VCIs 106. In some embodiments, a VCI among the number of VCIs can be a master VCI. For example, VCI 106-1 can be a master VCI, and VCIs 106-2, . . . , 106-N can be slave VCIs. The host 102 can be connected to (e.g., in communication with) a packet generation and injection apparatus 114.

In some embodiments, the packet generation and injection apparatus 114 can be configured to generate and/or inject packets to a syslog server associated with a software defined data center, as described in more detail herein. In some embodiments, the packet generation and injection apparatus 114 can be deployed on (e.g., may be running on) the host 102, and/or one or more of the VCIs 106. In some embodiments, the packet generation and injection apparatus 114 can be deployed on the host 102 or a VCI (e.g., VCI 106-1), which may be the only host 102 or VCI (e.g., VCI 106-1) that is running or is provisioned with a pool of computing resources.

In some embodiments, the packet generation and injection apparatus 114 can include a combination of software and hardware, or the packet generation and injection apparatus 114 can include software and can be provisioned by processing resource 108. An example of the packet generation and injection apparatus 114 is illustrated and described in more detail with respect to FIG. 2.

Figure 2:
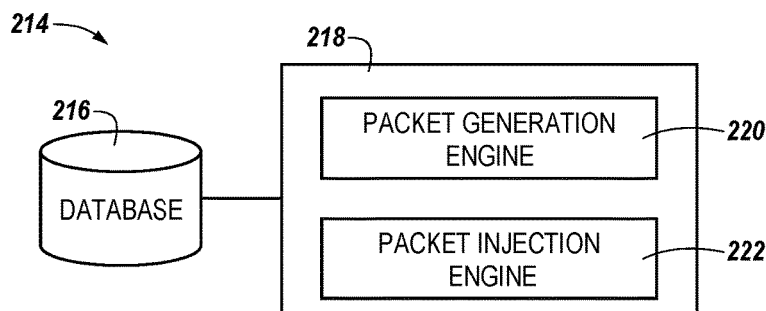
FIG. 2 is a diagram of a system for packet generation and injection according to the present disclosure.

FIG. 2 is a diagram of an apparatus for packet generation and injection according to the present disclosure. The apparatus 214 can include a database 216, a subsystem 218, and/or a number of engines, for example packet generation engine 220, and/or packet injection engine 222, and can be in communication with the database 216 via a communication link. The apparatus 214 can include additional or fewer engines than illustrated to perform the various functions described herein. The apparatus 214 can represent program instructions and/or hardware of a machine (e.g., machine 326 as referenced in FIG. 3, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines (e.g., 220, 222) can include a combination of hardware and program instructions that are configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the packet generation engine 220 can include a combination of hardware and program instructions that can be configured to generate a list of source IP addresses and/or generate a plurality of packets, wherein each packet among the plurality of packets includes a different respective source IP address from the list of source IP addresses. The packet generation engine 220 may be configured to inject the plurality of packets to a syslog server connected to the host.

The packet injection engine 222 can be configured to inject the plurality of packets to an ingestion system (e.g., syslog server) connected to an interface associated with a host. In some embodiments, the ingestion system can ingest and/or process packets as part of a testing operation to simulate network traffic from a plurality of sources.

In some embodiments, the packet generation engine 220 and/or the packet injection engine 222 can be configured to generate the plurality of packets such that each packet among the plurality of packets includes at least one of a user datagram protocol (UDP) syslog packet and/or an IPv4 layer. In some embodiments, the UDP syslog packet and/or the IPv4 layer may be included in the internet layer of the packet. As used herein, a "UDP syslog packet" is a minimal message-oriented internet protocol layer packet that uses the user datagram protocol. An "IPv4 layer" is an internet layer connectionless protocol that may be used in packet-switched networks, and an "IPv6 layer" is an internet layer communications protocol that provides an identification and location system for devices and/or components connected to a network. Embodiments are not limited to UDP syslog packets, and other packets, for example, other connectionless protocols (e.g., IP, internet control message protocol (ICMP), internetwork packet exchange (IPX), etc.) may be used.

In some embodiments, at least one packet of the plurality of packets may include a source address (e.g., IP source address) that is generated randomly. For example, a source address associated with one or more of the packets may be a randomly-generated source address. In some embodiments, packets among the plurality of packets can include source addresses that correspond to source addresses associated with a particular subnet. For example, each source address may be generated using source addresses that are sequentially generated from a subnet associated with the host.

Figure 3:
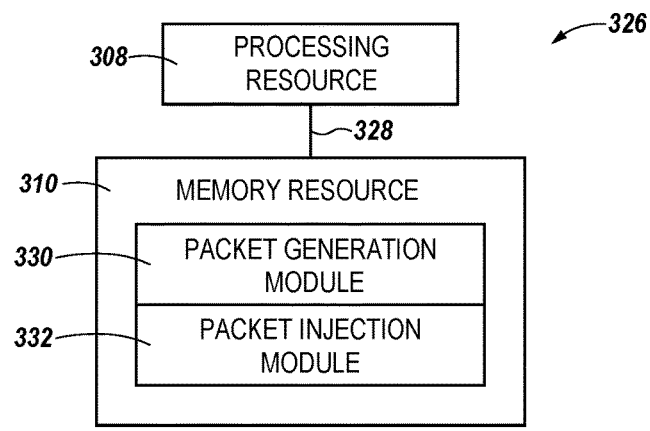
FIG. 3 is a diagram of a machine for packet generation and injection according to the present disclosure.

FIG. 3 is a diagram of a machine for packet generation and injection according to the present disclosure. The machine 326 can utilize software, hardware, firmware, and/or logic to perform a number of functions. The machine 326 can be a combination of hardware and program instructions configured to perform a number of functions (e.g., actions). The hardware, for example, can include a number of processing resources 308 and a number of memory resources 310, such as a machine-readable medium (MRM) or other memory resources 310. The memory resources 310 can be internal and/or external to the machine 326 (e.g., the machine 326 can include internal memory resources and have access to external memory resources). In some embodiments, the machine 326 can be a VCI, for example, the machine 326 can be a server. The program instructions (e.g., machine-readable instructions (MM)) can include instructions stored on the MRM to implement a particular function (e.g., an action such as packet generation and/or injection). The set of MRI can be executable by one or more of the processing resources 308. The memory resources 310 can be coupled to the machine 326 in a wired and/or wireless manner. For example, the memory resources 310 can be an internal memory, a portable memory, a portable disk, and/or a memory associated with another resource, e.g., enabling MM to be transferred and/or executed across a network such as the Internet. As used herein, a "module" can include program instructions and/or hardware, but at least includes program instructions.

Memory resources 310 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 308 can be coupled to the memory resources 310 via a communication path 328. The communication path 328 can be local or remote to the machine 326. Examples of a local communication path 328 can include an electronic bus internal to a machine, where the memory resources 310 are in communication with the processing resources 308 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 328 can be such that the memory resources 310 are remote from the processing resources 308, such as in a network connection between the memory resources 310 and the processing resources 308. That is, the communication path 328 can be a network connection. Examples of such a network connection can include a local area network (LAN), wide area network (WAN), personal area network (PAN), and the Internet, among others.

As shown in FIG. 3, the MRI stored in the memory resources 310 can be segmented into a number of modules 330 and 332, that when executed by the processing resource(s) 308, can perform a number of functions. As used herein a module includes a set of instructions included to perform a particular task or action. The number of modules 330, 332 can be sub-modules of other modules. For example, the packet injection module 332 can be a sub-module of the packet generation module 330 and/or can be contained within a single module. Furthermore, the number of modules 330, 332 can comprise individual modules separate and distinct from one another. Examples are not limited to the specific modules 330, 332 illustrated in FIG. 3.

Each of the number of modules 330, 332 can include program instructions and/or a combination of hardware and program instructions that, when executed by a processing resource 308, can function as a corresponding engine as described with respect to FIG. 2. For example, the packet generation module 330 can include program instructions and/or a combination of hardware and program instructions that, when executed by a processing resource 308, can function as the packet generation engine 220, the packet injection module 332 can include program instructions and/or a combination of hardware and program instructions that, when executed by a processing resource 308, can function as the packet injection engine 222.

In some approaches, a plurality of hosts can generate and/or receive network traffic. For example, network packets may be generated and/or received by a plurality of hosts. This network traffic may be injected to an ingestion system/syslog server via a network. In some approaches, actual network traffic may be monitored. However, as the number of hosts increases as, for example, in a software defined data center, so does the amount of network traffic, which can lead to network bottlenecks.

Figure 4:
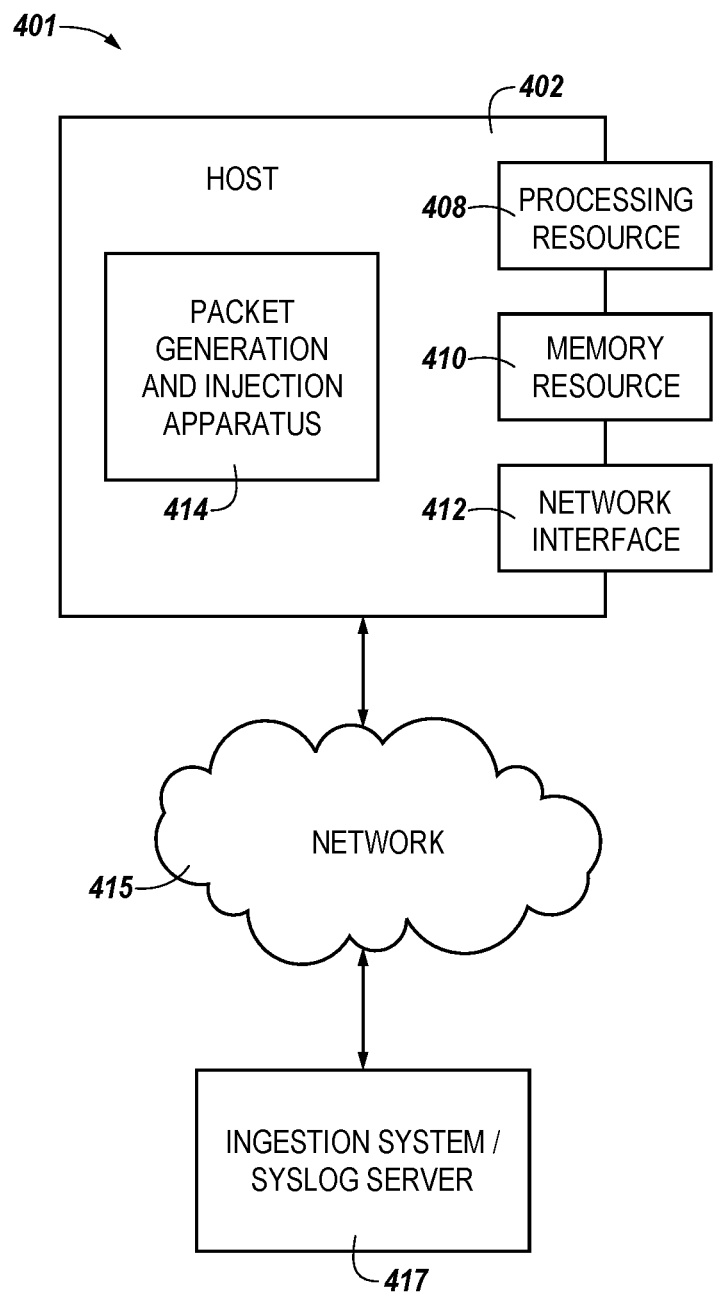
FIG. 4 is a diagram of a system including a host coupled to a packet generation and injection system for packet generation and injection according to the present disclosure.

FIG. 4 is a diagram of a system 401 including a host 402 coupled to a packet generation and injection apparatus 414 for packet generation and injection according to the present disclosure. In some embodiments, system 401 may be a testing system. Although not illustrated in FIG. 4, the host 402 can incorporate a hypervisor that can execute a number of VCIs, as illustrated in FIG. 1. The host may be connected to a network 415 and/or ingestion system/syslog server 417. In some embodiments, the packet generation and injection apparatus 414 may be configured to generate a series of packets and inject the packets to the ingestion system/syslog server 417. For example, the packet generation and injection apparatus 414 may be configured to generate a plurality of UDP syslog packets and inject the UDP syslog packets to the ingestion system/syslog server 417. In some embodiments, the packet generation and injection apparatus 414 may be configured to set the source addresses (e.g., IP source address) of the generated packets to known remote addresses. For example, the packet generation and injection apparatus 414 can be configured to set the source IP addresses of generated packets to IP addresses corresponding to IP addresses associated with a particular subnet. Examples are not so limited; however, and the packet generation and injection apparatus 414 can be configured to generate random IP addresses and set the source IP addresses of the generated packets to the randomly generated IP addresses.

The source IP addresses of the generated packets may be valid, invalid, or a combination thereof and/or may contain one or more spoofed IP sources addresses. For example, the source IP addresses of the generated packets may be invalid and each packet may include known data. For example, each packet may contain data that is known as the time the packet is generated. These packets may then be injected to ingestion system/syslog server 417. In some embodiments, these packets may be monitored as they move through the ingestion system/syslog server 417. In such an example, because the source IP addresses are known and are known to be invalid, this traffic may be hidden from a user while still providing testing data. Similarly, in some embodiments, live testing of the ingestion system/syslog server 417 may be carried out, because the content of the packets may be known and the source IP addresses of the packets may be known.

In some embodiments, the network traffic generated by the packet generation and injection apparatus 414 may appear to be coming from different hosts and/or sources. For example, at the network layer, the network traffic generated by the packet generation and injection apparatus 414 may appear to come from a plurality of remote VCIs. As used herein, a "network layer" refers to the network layer of the standard open systems interconnection (OSI) model. However, as described above, the network traffic may be generated using a single host 402 or VCI. In some embodiments, this may allow for traffic from a plurality of VCIs to be simulated with a single VCI or host 402.

In some embodiments, the packet generation and injection apparatus 415 may be connected to a host 402. The packet generation and injection apparatus 415 may be configured to cause a plurality of packets, each having a different source address, to be generated at the host 402 and cause the plurality of packets to be injected through a network interface 412 of the host 402. In some embodiments, the ingestion system/syslog server 417 may be connected to the host 402 and may be configured to ingest and process the plurality of packets. In some embodiments, at least one packet of the plurality of packets simulates network traffic from a VCI that is not initialized. For example, at least one packet of the plurality of packets simulates network traffic from a VCI that is not hosted by the host 402.

The packet generation and injection apparatus 417 may be configured to generate a respective random source IP address for each of the plurality of packets. In some embodiments, the packet generation and injection apparatus 417 may be configured to generate a respective source IP address from a list of subnet source IP addresses for each of the plurality of packets. In addition, the packet generation and injection apparatus 417 may be configured to cause the plurality of packets to be injected at a network layer associated with the host 402.

In some embodiments, packet generation and injection may be carried out using the following example pseudo code, which illustrates a process for generating a packet, writing raw bytes of data to an interface, and then allowing the host or kernel to route the packet as it would under normal operating conditions.

```
func main ( ) {
structflag.StructToFlags (" ", &config)
flag.Parse ( )
interfaces:=strings.Split (config.Interface, " ")
var iface *net.Interface
var targetAddr *net.UDPAddr
var err error
```

In the above block of pseudo code, "structflag" and "flag.parse( )" are related to reading the command line, and the "interfaces" line parses the configuration. In some embodiments, packet generation and injection may occur at the interface level, and may occur in the absence of "real" IP addresses (e.g., using spoofed IP addresses), so the interface on which the generated packets may be injected on may be determined. "targetAddr" relates to a UDP address of the interface that may be used when the IP addresses of the packets are spoofed, for example, during packet generation. In some embodiments, the UDP address may be valid so the local host will not discard the generated packets.

```
for _, i:=range interfaces {
   iface, err=net.InterfaceByName (i)
   if err !=nil {
      log.Println ("Failed to find iface:", I, err)
      continue
   }
   addrs, err:=iface.Addrs ( )
   if err !=nil {
      log.Println ("Failed to find addresses for interface",
         iface, err)
      continue
```

In some embodiments, the above for loop may be used to examine interfaces (e.g., network interfaces) associated with the software defined data center to find interfaces that match the interface information passed during configuration.

```
   }
   for _, addr:=range addrs {
      ip:=addr.(*net.IPNet).IP
      if !ip.Equal (ip.To4 ( )) {
         continue
```

The above for loop may be used to examine addresses associated with interfaces that match the interface information passed during configuration to determine if there are Internet protocol version 4 (IPv4) addresses associated with each interface that matches the interface information passed during configuration. In some embodiments, this for loop may be used if one or more interfaces are identified that match the interface information passed during configuration. Although specific reference is made to IPv4 addresses, it is contemplated that other Internet protocol version addresses (e.g., IPv6, etc.) may be determined. If at least one IPv4 address is found, a UDP address that may be used during packet injection may be built using the IPv4 address. In some embodiments, if a IPv4 address is not found on a particular interface, the next interface (provided one exists) may be examined to determine if there are one or more IPv4 addresses associated with the next interface.

```
   }
   if targetAddr, err = net.ResolveUPDAddr ("udp),
net.JoinHostPort (ipstring ( ), strconv.Iota (config.Port))); err != nil {
      log.Println ("Failed to resolve target address", err,
reflect.TypeOf(addrs [0]))
```

-continued

```
         continue
      }
   }
   if targetAddr !=nil {
      break
   }
}
if iface == nil {
   log.Fatalln("Failed to find any valid interfaces matching",
interfaces)
}
```

In the above block of pseudo code, if no matching interfaces are found, the process is stopped, and a message indicating that the operation failed to find any valid interfaces matching may be displayed.

```
log.Println("Logging to", targetAddr)
sourceAddresses:=make([ ]*net.UDPAddr, 0, config.
SourceAddressCount)
sourceIPs:=make([ ]net.IP, 0, config.SourceAddress-
Count)
for i:=1; i<=config.SourceAddressCount; i++ {
   ip:=i
   sourcePort:=rand.Intn(60000)+1000
   source:=fmt.Sprintf("%d.%d.%d.%d:%d",     10,
      ip>>16&0xff, ip>>8&0xff, ip&0xff, sourcePort)
   sourceIPs=append(sourceIPs,   net.ParseIP(fmt.Sprintf
      ("%d.%d.%d.%d",   ip>>24&0xff,   ip>>16&0xff,
      ip>>8&0xff, ip&0xff)))
   if udpAddr, err:=net.ResolveUDPAddr("udp", source);
      err !=nil {
      log.Fatalln("Failed to resolve source address:", source,
         err)
   } else {
      sourceAddresses=append(sourceAddresses, udpAddr)
   }
}
```

In the above block of pseudo code, a list of source IP addresses may be built. In this example, the source IP addresses may be generated sequentially, for example from a particular subnet. Although particular reference is made here to sequentially generating source IP addresses, source IP addresses may be generated in different manners. For example, the source IP addresses of the list of source IP addresses may generated randomly.

In some embodiments, the above for loop may be used to build a UDP addresses with a random source port. In this example, a string formatted source IP address may be generated based on the sequentially generated source IP address, and appended to the source IP list. In some embodiments, the appended string formatted source IP address may then be resolved into a UDP address. This generated UDP address may then be parsed and appended to the source IP address as a parsed UDP address. This process may be repeated to generate a list of source IP addresses.

```
pcapHandle,    err:=pcap.OpenLive(iface.Name,    1400,
false, pcap.BlockForever)
if err !=nil {
   log.Fatalln("Failed to open pcap:", err)
}
```

In some embodiments, "pcapHandle" may be called to inject packets through the interface. For example, a wrapper may be opened around an interface (e.g., at least one find interface that matches the interface information passed during configuration), and packet injection may commence.

```
    log.Printf("Generating %d messages from %d sources",
config.MessageCount, config.SourceAddressCount)
    start := time.Now( )
    for i := 0; i < config.MessageCount; i++ {
        s := sourceAddresses[i%len(sourceAddresses)]
        message := [ ]byte(fmt.Sprintf("message to %s from %s",
targetAddr, s))
        eth := &layers.Ethernet{SrcMAC: iface.HardwareAddr,
DstMAC: iface.HardwareAddr, EthernetType: layers.EthernetTypeIPv4}
        udp := &layers.UDP{
            SrcPort: layers.UDPPort(s.Port),
            DstPort: layers.UDPPort(targetAddr.Port),
        }
```

The for loop in the above block of pseudo code may be used to take each source IP address and/or generate a message string that may be injected through the interface. In some embodiments, a packet may be generated comprising multiple layers. For example, a packet may generated having an Ethernet layer (e.g., using the "layers.Ethernet" line), an IPv4 layer (e.g., using the "layers.EthernetTypeIPv4" line), and a UDP layer (e.g., using the "layers.UDP" line). In some embodiments, the packet containing data may be wrapped with the UDP address, which may be wrapped with the IPv4 address, which may be wrapped with the Ethernet layer. The data may be raw data, which may be written from a generated byte array associated with each message. In some embodiments, the message may comprise a source address and/or a destination address.

```
    ip:=&layers.IPv4{
    Version: 4,
    IHL: 5,
    TTL: 10,
    Protocol: layers.IPProtocolUDP,
    SrcIP: s.IP,
    DstIP: targetAddr.IP,
    }
    udp.SetNetworkLayerForChecksum(ip)
    buf:=gopacket.NewSerializeBuffer( )
    opts:=gopacket.SerializeOptions{ComputeChecksums:
        true, FixLengths: true}
    gopacket.Payload(message).SerializeTo(buf, opts)
    udp.SerializeTo(buf, opts)
    ip.SerializeTo(buf, opts)
    eth.SerializeTo(buf, gopacket.SerializeOptions{ })
    packetData:=buf.Bytes( )
    if   err:=pcapHandle.WritePacketData(packetData);   err
        !=nil {
        log.Println("Failed to send packet", err)
    }
    if config.MessageDelay >0 {
        time.Sleep(config.MessageDelay)
    }
    }
    log.Printf("Sent %d messages in %v", config.Message-
Count, time.Now( ).Sub(start))
}
```

In some embodiments, after the packet is generated, a UDP packet may be populated, data associated with the packet may be serialized to the packet, and/or checksums may be set. For example, the packet may be serialized by wrapping layers over the data associated with the packet. In some embodiments, the data may be serialized first. Next, the UDP headers may be serialized onto the data. After this, the IPv4 headers may be serialized on top of the pervious layer, and the Ethernet headers may be serialized on top of that. In some embodiments, using the "pcapHandle" described above, the packet data may be sent to an Ethernet adapter, and/or to the interface. This process may be repeated numerous times to generate packets to be injected through the interface.

Figure 5:
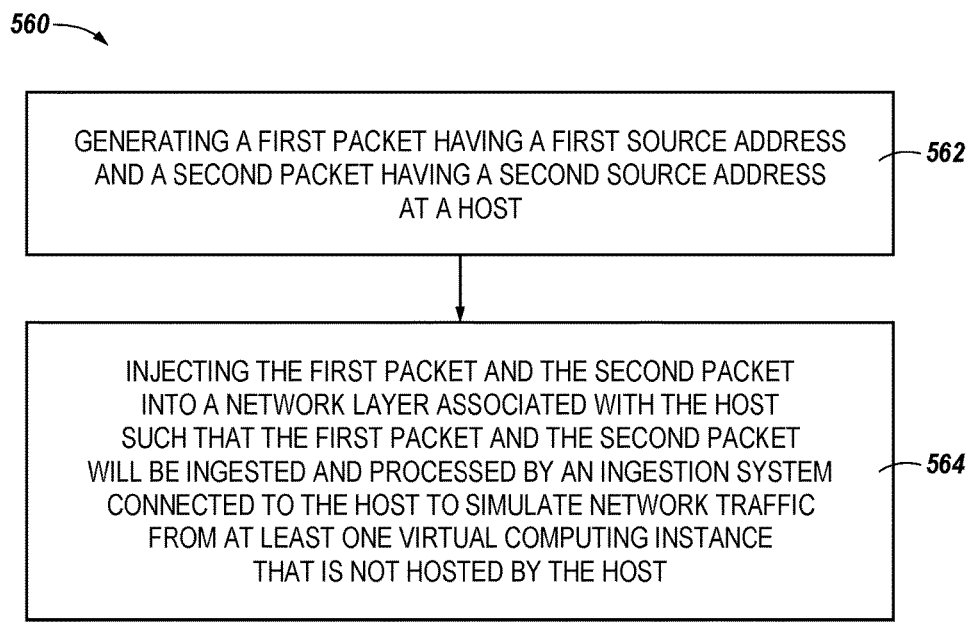
FIG. 5 is a flow diagram illustrating a method for packet generation and injection according to the present disclosure.

FIG. 5 is a flow diagram illustrating a method 560 for packet generation and injection according to the present disclosure. At block 562, the method 560 can include generating a first packet having a first source address and a second packet having a second source address at a host. In some embodiments, the first source address and the second source address may be different source addresses.

At block 564, the method 560 can include injecting the first packet and the second packet at a network layer associated with the host such that the first packet and the second packet will be ingested and processed by an ingestion system connected to the host to simulate network traffic from at least one VCI that is not hosted by the host. In some embodiments, the ingestion system may comprise a syslog server. For example, network traffic may be simulated for VCIs that are not initialized or hosted by the host. In some embodiments, this may facilitate testing of network traffic in a software defined data center in the absence of initialized or provisioned VCIs with a single host computing device In some embodiments, the method 560 can include generating a first UDP syslog packet and generating a second UDP syslog packet. The first UDP syslog packet may be associated with the first packet, and the second UDP syslog packet may be associated with the second packet.

In some embodiments, the method 560 may include generating a first spoofed IP address, appending the first spoofed IP address to the first packet, generating a second spoofed IP address, and appending the second spoofed IP address to the second packet. For examples, the source address of the first packet and/or the source address of the second packet may be spoofed IP addresses.

In some embodiments, the method 560 may include determining that at least one of the first packet and the second packet has been received at the ingestion system and/or determining that at least one of the first packet and the second packet has not been received at the ingestion system. The method 560 may include providing, in response to receiving the first packet and the second packet at the host computing device, an indication to the host that the at least one of the first packet and the second packet has been received at the ingestion system and/or providing, in response to not receiving the first packet and the second packet at the ingestion system, an indication to the host that the second packet has not been received at the ingestion system. In some embodiments, providing such indications may allow for monitoring of the packets and/or may provide information as to whether or not the packets have been injected to the ingestion system.

In some embodiments, the method 560 may include monitoring the first packet and the second packet as part of a test operation to simulate network traffic from the at least one computing instance that is not hosted by the host. For example, the first and/or second packet may be monitored in order to test the behavior of network packet traffic in a software defined data center while using a single host to generate the network traffic.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A testing system, comprising:
   a packet generation and injection apparatus deployed on a virtual computing instance (VCI), wherein the packet generation and injection apparatus is configured to:
   cause a plurality of packets, each having a different source address, to be generated at the VCI; and
   cause the plurality of packets to be injected through a network interface of the VCI prior to ingestion by a syslog server, wherein the syslog server is configured to ingest and process the plurality of packets.

2. The system of claim 1, wherein at least one packet of the plurality of packets simulates network traffic from a virtual computing instance that is not initialized.

3. The system of claim 1, wherein at least one packet among the plurality of packets includes an invalid remote source Internet protocol address.

4. The system of claim 3, wherein at least one packet among the plurality of packet includes a valid remote source Internet protocol address.

5. The system of claim 1, wherein at least one packet among the plurality of packets includes a spoofed Internet protocol address.

6. The system of claim 1, wherein the packet generation and injection apparatus is configured to generate a respective random source Internet protocol address for each of the plurality of packets.

7. The system of claim 1, wherein the packet generation and injection apparatus is configured to generate a respective source Internet protocol address from a list of subnet source IP addresses for each of the plurality of packets.

8. The system of claim 1, wherein the plurality of packets comprise user datagram protocol (UDP) syslog packets; and
   wherein the packet generation and injection apparatus is further configured to cause the plurality of packets to be injected at a network layer associated with the host.

9. A method, comprising:
   generating a first packet having a first source address and a second packet having a second source address different than the first source address at a host; and
   injecting the first packet and the second packet at a network layer associated with the host such that the first packet and the second packet will be ingested and processed by an ingestion system connected to the host prior to ingestion by a syslog server to simulate network traffic from at least one virtual computing instance that is not hosted by the host.

10. The method of claim 9, wherein generating the first packet and the second packet includes:
    generating a first user datagram protocol (UDP) syslog packet; and
    generating a second UDP syslog packet.

11. The method of claim 9, wherein generating the first packet and the second packet includes:
    generating a first spoofed Internet protocol address;
    appending the first spoofed IP address to the first packet;
    generating a second spoofed IP address; and
    appending the second spoofed IP address to the second packet.

12. The method of claim 9, further comprising:
    determining that at least one of the first packet and the second packet has been received at the ingestion system; and
    providing, in response to receiving the first packet and the second packet at the host computing device, an indication to the host that the at least one of the first packet and the second packet has been received at the ingestion system.

13. The method of claim 9, further comprising:
    determining that at least one of the first packet and the second packet has not been received at the ingestion system; and
    providing, in response to not receiving the first packet and the second packet at the ingestion system, an indication to the host that the second packet has not been received at the ingestion system.

14. The method of claim 9, further comprising monitoring the first packet and the second packet as part of a test operation to simulate network traffic from the at least one computing instance that is not hosted by the host.

15. A non-transitory machine-readable medium storing instructions executable by a processing resource to:
    generate a list of source Internet protocol addresses;
    generate, by a packet generation and injection apparatus deployed on a virtual computing instance (VCI), a plurality of packets, wherein each packet includes a different respective source IP address from the list of source IP addresses; and
    inject the plurality of packets, through a network interface of the VCI, to an ingestion system connected to an interface associated with a host prior to ingestion by a syslog server.

16. The non-transitory medium of claim 15, wherein the instructions are executable by the processing resource to generate the plurality of packets such that each packet includes a user datagram protocol (UDP) syslog packet.

17. The non-transitory medium of claim 15, wherein the instructions are executable by the processing resource to generate the plurality of packets such that each packet includes at least one of an IPv4 layer and an IPv6 layer.

18. The non-transitory medium of claim 15, wherein the ingestion system comprises a syslog server connected to the host.

19. The non-transitory medium of claim 15, wherein the instructions are executable by the processing resource to generate the respective source IP addresses randomly.

20. The non-transitory medium of claim 15, wherein the instructions are executable by the processing resource to generate the respective source IP addresses sequentially from a subnet associated with a host.

* * * * *